(12) United States Patent
Liu et al.

(10) Patent No.: US 8,982,265 B2
(45) Date of Patent: Mar. 17, 2015

(54) IMAGE PROJECTION AND CAPTURE APPARATUS

(75) Inventors: Zhan-Yu Liu, Hsinchu (TW); Yi-Hsueh Chen, Hsinchu (TW); Hsin-Hung Lin, Hsinchu (TW); Ya-Ling Hsu, Hsinchu (TW); Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 230 days.

(21) Appl. No.: 13/445,921

(22) Filed: Apr. 13, 2012

(65) Prior Publication Data

US 2013/0271635 A1    Oct. 17, 2013

(51) Int. Cl.
| | |
|---|---|
| H04N 5/222 | (2006.01) |
| G02B 13/16 | (2006.01) |
| H04N 5/225 | (2006.01) |
| G03B 21/26 | (2006.01) |
| G03B 17/17 | (2006.01) |
| G03B 17/54 | (2006.01) |
| G03B 21/28 | (2006.01) |
| H04N 9/31 | (2006.01) |

(52) U.S. Cl.
CPC ............ *G03B 17/17* (2013.01); *G03B 17/54* (2013.01); *G03B 21/28* (2013.01); *H04N 9/3176* (2013.01); *H04N 9/3194* (2013.01)
USPC ............. 348/333.1; 353/34; 353/37; 348/335

(58) Field of Classification Search
CPC ...... G03B 21/00; G03B 17/54; H04N 9/3176; H04N 9/3194
USPC ............... 348/333.011, 333.1, 335, 744–789; 359/443–461, 641, 649, 637; 353/20, 353/30–37, 46–51, 69–70, 79, 100–101, 353/119; 349/5–10, 57
See application file for complete search history.

(56) References Cited

U.S. PATENT DOCUMENTS

| | | | | |
|---|---|---|---|---|
| 5,442,413 | A * | 8/1995 | Tejima et al. | 353/69 |
| 5,612,814 | A * | 3/1997 | Yang | 359/291 |
| 5,820,240 | A * | 10/1998 | Ohzawa | 353/70 |
| 6,076,931 | A * | 6/2000 | Bone et al. | 353/100 |
| 6,450,648 | B1 * | 9/2002 | Ohzawa et al. | 353/70 |
| 6,707,444 | B1 | 3/2004 | Hendriks et al. | |
| 6,808,270 | B2 * | 10/2004 | Nelson et al. | 353/69 |
| 7,025,461 | B2 * | 4/2006 | Veligdan et al. | 353/37 |
| 7,144,117 | B2 * | 12/2006 | Kojima | 353/37 |
| 7,145,728 | B2 * | 12/2006 | Cha | 359/637 |
| 7,557,341 | B2 * | 7/2009 | Chou et al. | 250/235 |
| 8,662,675 | B2 * | 3/2014 | Destain | 353/69 |
| 2003/0122780 | A1 * | 7/2003 | Hendriks et al. | 345/156 |
| 2003/0123031 | A1 * | 7/2003 | Nelson et al. | 353/31 |
| 2004/0080938 | A1 * | 4/2004 | Holman et al. | 362/231 |
| 2005/0047736 | A1 * | 3/2005 | Veligdan et al. | 385/120 |
| 2005/0162409 | A1 * | 7/2005 | Hendriks et al. | 345/173 |

(Continued)

*Primary Examiner* — Pritham Prabhakher
(74) *Attorney, Agent, or Firm* — Jianq Chyun IP Office

(57) ABSTRACT

The image projection and capture apparatus for projecting an image beam to display an image on a screen and sensing a sensing beam from the image on the screen, the image projection and capture apparatus includes a light source, a light valve, a projection lens, an image capture lens, a dichroic unit, and an image sensor. The light source provides an illumination beam. The light valve is capable of converting the illumination beam to the image beam. The projection lens has a first optical axis. The image capture lens has a second optical axis. The first optical axis and the second optical axis are collinear. The dichroic unit is disposed between the projection lens and the image capture lens. The image sensor is disposed on a light path of the sensing beam.

16 Claims, 6 Drawing Sheets

(56) References Cited

U.S. PATENT DOCUMENTS

| | | | |
|---|---|---|---|
| 2005/0254334 A1* | 11/2005 | Takeuchi et al. | 365/232 |
| 2006/0164726 A1* | 7/2006 | Morejon et al. | 359/495 |
| 2007/0263174 A1 | 11/2007 | Shyu et al. | |
| 2007/0273798 A1* | 11/2007 | Silverstein et al. | 348/752 |
| 2009/0207322 A1* | 8/2009 | Mizuuchi et al. | 348/745 |
| 2010/0128231 A1* | 5/2010 | Furui | 353/70 |
| 2010/0201895 A1* | 8/2010 | Golub | 348/759 |
| 2011/0261274 A1* | 10/2011 | Shiue et al. | 349/9 |
| 2012/0008102 A1* | 1/2012 | Destain | 353/69 |
| 2012/0169673 A1* | 7/2012 | Wilson | 345/175 |
| 2012/0200832 A1* | 8/2012 | Imai | 353/20 |

\* cited by examiner

IMAGE PROJECTION AND CAPTURE APPARATUS

BACKGROUND OF THE INVENTION

1. Field of the Invention

The invention generally relates to an optical apparatus, and more particularly, to an image projection and capture apparatus.

2. Description of Related Art

A conventional projector can capture a real time image by additionally setting an image capture lens, so as to interact with a user by the image capture lens. The performance of the image capture lens plays an important role in the interact sensitivity. How to improve the interact sensitivity and reduce the size of the image capture lens is a challenge for the designer.

US Pub. No. 20070263174 discloses an optical projection and image sensing apparatus including a light source, a light valve, a first lens set, a sensing module, and a beam splitter. The light valve is used to convert an illumination light from the light source to an image light beam. The first lens set is used to project the image light to display an image on a screen, and the sensing module is used to sense a sensing light from the image on the screen. The beam splitter is disposed on the optical paths of the image light and the sensing light from the image on the screen. U.S. Pat. No. 6,707,444 discloses a projector and camera arrangements for use in electronic whiteboard systems. The projector and camera arrangements includes an illumination module, a light valve, X-cube, a projection lens, an IR-reflecting, visible-transmitting cube, and an IR CCD sensor.

SUMMARY OF THE INVENTION

Accordingly, the invention is directed to an image projection and capture apparatus with good interact sensitivity.

The invention is also directed to an image projection and capture apparatus with good interact sensitivity and optimal size.

Other objectives, features and advantages of the invention will be further understood from the further technological features disclosed by the embodiments of the invention.

To achieve one of, a part of or all of the above-mentioned objectives, or to achieve other objectives, an embodiment of the invention provides an image projection and capture apparatus for projecting an image beam to display an image on a screen and sensing a sensing beam from the image on the screen. The image projection and capture apparatus includes a light source, a light valve, a projection lens, an image capture lens, a dichroic unit, and an image sensor. The light source is capable of providing an illumination beam. The light valve is disposed on a light path of the illumination beam and capable of converting the illumination beam to the image beam. The projection lens is disposed on a light path of the image beam and has a first optical axis. The image capture lens has a second optical axis. The first optical axis and the second optical axis are parallel and overlapped. The dichroic unit is disposed on the light path of the image beam and between the projection lens and the image capture lens. The image sensor is disposed on a light path of the sensing beam.

Another embodiment of the invention provides an image projection and capture apparatus for projecting an image beam to display an image on a screen and sensing a sensing beam from the image on the screen. The image projection and capture apparatus includes a light source, a light valve, a projection lens, a dichroic unit, an image capture lens, and an image sensor. The light source is capable of providing an illumination beam. The light valve is disposed on a light path of the illumination beam and capable of converting the illumination beam to the image beam. The projection lens is disposed on a light path of the image beam and has a first optical axis. The dichroic unit is disposed on the light path of the image beam. The image capture lens has a second optical axis. The first optical axis and the second optical axis are interlaced. The image sensor is disposed on a light path of the sensing beam. The light valve has a first active surface perpendicular to the first optical axis. The first active surface is rectangle and has two first long edges and two first short edges. One of the two first short edges has a first width D along a first direction perpendicular to the first optical axis. One of the two first long edges has a first length E along a second direction perpendicular to the first direction and the first optical axis. A distance F exists between the first optical axis and one of the two first long edges closer to the first optical axis. The light valve has a first aspect ratio $AR_{DMD}=[E/D]$ and a first offset $O_{DMD}=[(D+F)/D]*100\%$. The image sensor has a second active surface perpendicular to the second optical axis. The second active surface is rectangle and has two second long edges and two second short edges. One of the two second short edges has a second width A along a third direction perpendicular to the second optical axis. One of the second long edges has a second length B along a fourth direction perpendicular to the third direction and the second optical axis. A distance C exists between the second optical axis and one of the two second long edges closer to the second optical axis. The image sensor has a second aspect ratio $AR_{sensor}=[B/A]$ and a second offset $O_{sensor}=[(A+C)/A]*100\%$. When $AR_{sensor}$ is smaller than $AR_{DMD}$, $O_{sensor}$ and $O_{DMD}$ satisfy: $O_{sensor}=O_{DMD}*(AR_{sensor}/AR_{DMD})$. When $AR_{sensor}$ is greater than $AR_{DMD}$ or equal to $AR_{DMD}$, $O_{sensor}$ and $O_{DMD}$ satisfy: $O_{sensor}=O_{DMD}$.

According to an embodiment of the invention, the sensing beam is an invisible beam.

According to an embodiment of the invention, the invisible beam is an infrared ray.

According to an embodiment of the invention, the light valve has a first active surface perpendicular to the first optical axis, the first active surface is rectangle, the first active surface has two first long edges and two first short edges, one of the two first short edges has a first width D along a first direction perpendicular to the first optical axis, one of the two long edges has a first length E along a second direction perpendicular to the first direction and the first optical axis, A distance F exists between the first optical axis and one of the two first long edges closer to the first optical axis, the light valve has a first aspect ratio $AR_{DMD}=[E/D]$, and a first offset $O_{DMD}=[(D+F)/D]*100\%$.

According to an embodiment of the invention, the image sensor has a second active surface perpendicular to the second optical axis, the second active surface is rectangle and has two second long edges and two second short edges, one of the two second short edges has a second width A along a third direction perpendicular to the second optical axis, one of the second long edges has a second length B along a fourth direction perpendicular to the third direction and the second optical axis, A distance C exists between the second optical axis and one of the two second long edges closer to the second optical axis, the image sensor has a second aspect ratio $AR_{sensor}=[B/A]$, and a second offset $O_{sensor}=[(A+C)/A]*100\%$.

According to an embodiment of the invention, when $AR_{sensor}$ is smaller than $AR_{DMD}$, $O_{sensor}$ and $O_{DMD}$ satisfy: $O_{sensor}=O_{DMD}*(AR_{sensor}/AR_{DMD})$.

According to an embodiment of the invention, when $AR_{sensor}$ is greater than $AR_{DMD}$, $O_{sensor}$ and $O_{DMD}$ satisfy: $O_{sensor}=O_{DMD}$.

According to an embodiment of the invention, when $AR_{sensor}$ is equal to $AR_{DMD}$, $O_{sensor}$ and $O_{DMD}$ satisfy: $O_{sensor}=O_{DMD}$.

According to an embodiment of the invention, the sensing beam passes through the dichroic unit to the image capture lens, the image beam from the projection lens is reflected to the screen by the dichroic unit.

According to an embodiment of the invention, the sensing beam from the screen is reflected to the image capture lens by the dichroic unit, the image beam from the projection lens passes through the dichroic unit to the screen.

According to an embodiment of the invention, the image projection and capture apparatus further comprises a reflector. The dichroic unit and the image capture lens are disposed between the reflector and the projection lens. The sensing beam from the screen passes through the dichroic unit to the reflector, the sensing beam is reflected to the image capture lens by the reflector. The image beam from the projection lens is reflected to the screen by the dichroic unit.

According to an embodiment of the invention, the image capture lens penetrates the dichroic unit.

According to an embodiment of the invention, the reflector is capable of reflecting an invisible beam.

According to an embodiment of the invention, the dichroic unit is a dichroic mirror.

According to an embodiment of the invention, the dichroic unit is disposed inside the projection lens, and the first optical axis is interlaced with the second optical axis at a location of the dichroic unit.

According to an embodiment of the invention, the image projection and capture apparatus further comprises a reflecting unit. The image beam from the projection lens is reflected to the screen by the reflecting unit. The sensing beam from the screen is reflected to the image capture lens by the reflecting unit.

According to an embodiment of the invention, the image beam passes through the dichroic unit to the screen, and the sensing beam is reflected to the image capture lens by the dichroic unit.

According to an embodiment of the invention, the first optical axis is substantially perpendicular to the second optical axis.

Based on the description above, the image projection and capture apparatus of the invention could avoid distortion of the sensing image by the design that the first optical axis and the second optical axis are collinear. Also, since the first optical axis and the second optical axis are collinear, the image capture position may not be affected by the change of the projection distance. Thereby, the interaction sensitivity of the image projection and capture apparatus of the invention is good.

Moreover, in the image projection and capture apparatus of the invention, the image circle of the capture image could be fully utilized by designing the relationship between the aspect ratio of the light valve, the offset of the light valve, the aspect ratio of the image sensor, and the offset of the image sensor. Thereby, the size of the image capture lens may be minimum, and the image projection and capture apparatus of the invention has optimal size.

In order to make the aforementioned and other features and advantages of the invention comprehensible, several exemplary embodiments accompanied with figures are described in detail below.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising" or "having" and variations thereof herein is meant to encompass the items listed thereafter and equivalents thereof as well as additional items. Unless limited otherwise, the terms "connected", "coupled" and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
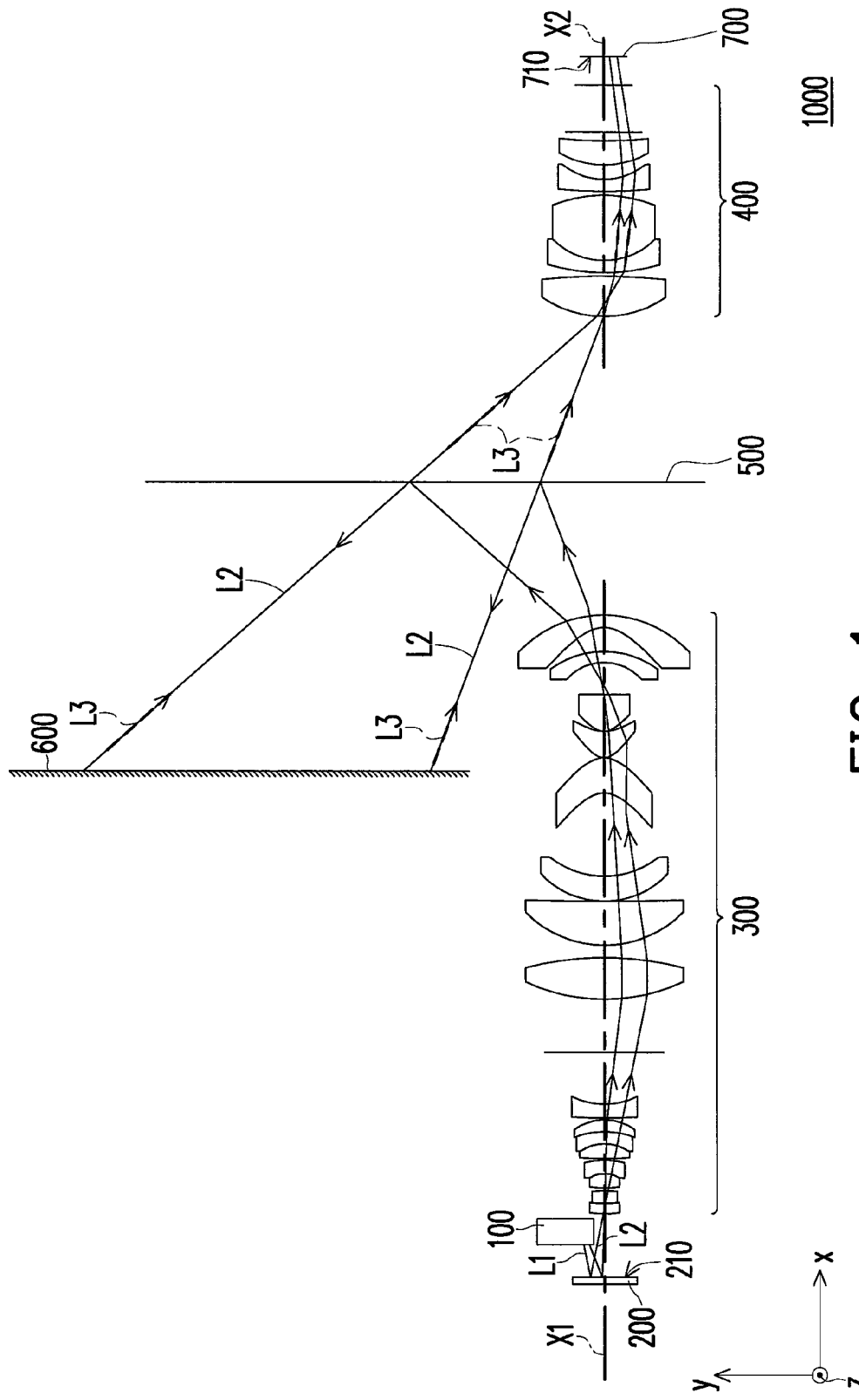
FIG. 1 is a diagram of the image projection and capture apparatus according to the first embodiment of the invention.

FIG. 1 is a diagram of the image projection and capture apparatus according to the first embodiment of the invention. Referring to FIG. 1, an image projection and capture apparatus 1000 of the embodiment includes a light source 100, a light valve 200, a projection lens 300, an image capture lens 400, a dichroic unit 500, a screen 600, and an image sensor 700. The light source 100 is capable of providing an illumination beam L1. The light valve 200 is disposed on a light path of the illumination beam L1 and capable of converting the illumination beam L1 to an image beam L2. The light valve 200 of the present embodiment may be a digital micro-mirror device (DMD), a liquid-crystal-on-silicon (LCOS) panel, or a transmissive liquid crystal display panel. However, the invention is not limited thereto.

The projection lens 300 in the embodiment is disposed on a light path of the image beam L2 and has a first optical axis X1. In the embodiment, the projection lens 300 may include a plurality of lens. However, the projection lens of the invention is not limited to the projection lens 300 shown in FIG. 1. The amount of optical devices of the projection lens and the type of the optical devices may be designed in accordance with the actual requirement.

The image capture lens 400 in the embodiment has a second optical axis X2. In the embodiment, the first optical axis X1 and the second optical axis X2 are parallel and overlapped. In other word, the first optical axis X1 and the second optical axis X2 are collinear. The image capture lens 400 of the embodiment may include a plurality of lens. However, the image capture lens of the invention is not limited to the image capture lens 400 shown in FIG. 1. The amount of optical devices of the image capture lens and the type of the optical devices could be designed in accordance with the actual requirement.

The dichroic unit 500 of the embodiment is disposed on the light path of the image beam L2 and between the projection lens 300 and the image capture lens 400. The dichroic unit 500 is capable be passed through by a first beam of light and reflecting a second beam of light, wherein the first beam of light and the second beam of light have different wavelengths. In other word, the dichroic unit 500 of the embodiment may be a dichroic mirror. However, the invention is not limited thereto.

In the embodiment, the image beam L2 from the light valve 200 passes through the projection lens 300 to the dichroic unit 500. Then, the image beam L2 may be reflected to the screen 600 by the dichroic unit 500 to form an image on the screen 600.

Moreover, the image capture lens 400 may sense a sensing beam L3 from the image on the screen 600. The sensing beam L3 and the image beam L2 have different wavelengths. In the embodiment, the image beam L2 may be a visible beam and the sensing beam L3 may be an invisible beam. In detail, wavelengths of the image beam L2 may be between 400 nm and 700 nm, and wavelengths of the sensing beam L3 may be between 770 nm and 1 mm. In other word, the sensing beam L3 of the embodiment may be an infrared ray.

The image sensor 700 is disposed on a light path of the sensing beam L3. In the embodiment, the sensing beam L3 from the screen 600 may pass through the dichroic unit 500 to the image capture lens 400. Then, the image capture lens 400 transmits the sensing beam L3 to the image sensor 700. The image capture lens 400 and the image sensor 700 are used to sense the variation of the image on the screen 600. Therefore, when the user touches the screen 600, the image sensor 700 senses the variation of the sensing beam L3 from the image on the screen 600, so as to achieve the effect of the touch screen. The image sensor 700 of the embodiment may be a charge coupled device (CCD) or a CMOS. However, the invention is not limited thereto.

Figures 2, 3:
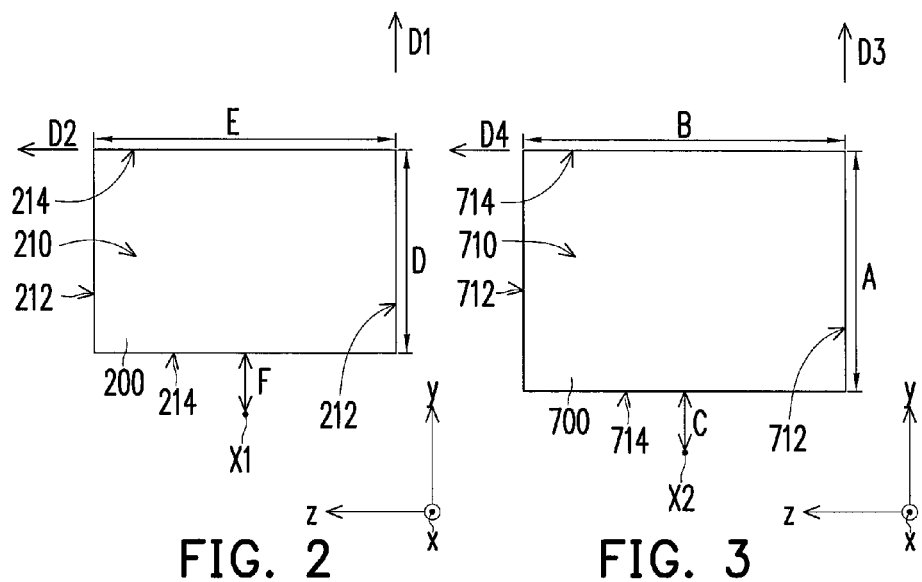
FIG. 2 illustrates the light valve and a first optical axis according to one exemplary embodiment of the invention.
FIG. 3 illustrates the image sensor and a second optical axis according to one exemplary embodiment of the invention.

FIG. 2 illustrates the light valve and a first optical axis according to one exemplary embodiment of the invention. Referring to FIG. 2, the light valve 200 has a first active surface 210 perpendicular to the first optical axis X1. The first active surface 210 is, for example, rectangle. The first active surface 210 has two first short edges 212 and two first long edges 214. One of the two first short edges 212 has a first width D along a first direction D1 perpendicular to the first optical axis X1. One of the two first long edges 214 has a first length E along a second direction D2 perpendicular to the first direction D1 and the first optical axis X1. Distance F exists between the first optical axis X1 and one of the two first long edges 214 closer to the first optical axis X1. The light valve 200 has a first aspect ratio $AR_{DMD}=[E/D]$. The light valve 200 has a first offset $O_{DMD}=[(D+F)/D]*100\%$.

FIG. 3 illustrates the image sensor and a second optical axis according to one exemplary embodiment of the invention. Referring to FIG. 3, the image sensor 700 has a second active surface 710 perpendicular to the second optical axis X2. The second active surface 710 is, for example, rectangle and has two second short edges 712 and two second long edges 714. One of the two second short edges 712 has a second width A along an third direction D3 perpendicular to the second optical axis X2. One of the two second long edges 714 has a second length B along a fourth direction D4 perpendicular to the third direction D3 and the second optical axis X2. Distance C exists between the second optical axis X2 and one of the two second long edges 714 closer to the second optical axis X2. The image sensor 700 has a second aspect ratio $AR_{sensor}=[B/A]$. The image sensor 700 has a second offset $O_{sensor}=[(A+C)/A]*100\%$.

Figure 4:
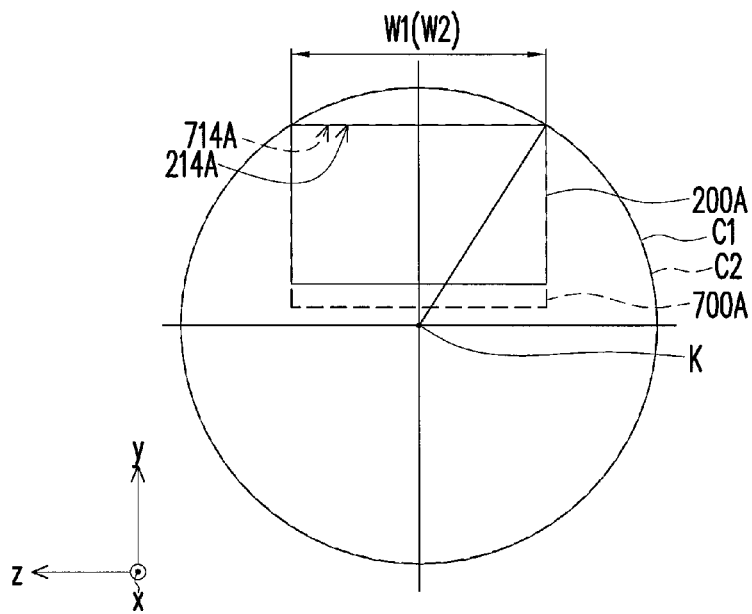
FIG. 4 illustrates a projection image of the light valve on the screen, an image circle of the projection image, a capture image of the image sensor on the screen and an image circle of the capture image according to one exemplary embodiment of the invention.

FIG. 4 illustrates a projection image of the light valve on the screen, an image circle of the projection image, a capture image of the image sensor on the screen and an image circle of the capture image according to one exemplary embodiment of the invention. Referring to FIG. 1 and FIG. 4, in the embodiment, $AR_{sensor}$ is smaller than $AR_{DMD}$. The design of magnification ratio of the image capture lens 400 makes a width W1 of the projection image 200A of the light valve 200 on the screen 600 (as paper surface in FIG. 4) be equal to a width W2 of the capture image 700A of the image sensor 700 on the screen 600, and a long side 214A of the projection image 200A farther from a point K is match with a long sides 714A of the capture image 700A farther from the point K. If $O_{sensor}$ and $O_{DMD}$ satisfy the equation 1: $O_{sensor}=O_{DMD}*(AR_{sensor}/AR_{DMD})$, the image circle C1 of the projection image 200A is match with the image circle C2 of the capture image 700A Thereby, the image circle C2 of the capture image 700A may be fully utilized, and the size of the image capture lens 400 may be minimum. In the same time, the image projection and capture apparatus 1000 has optimal size.

Figure 5:
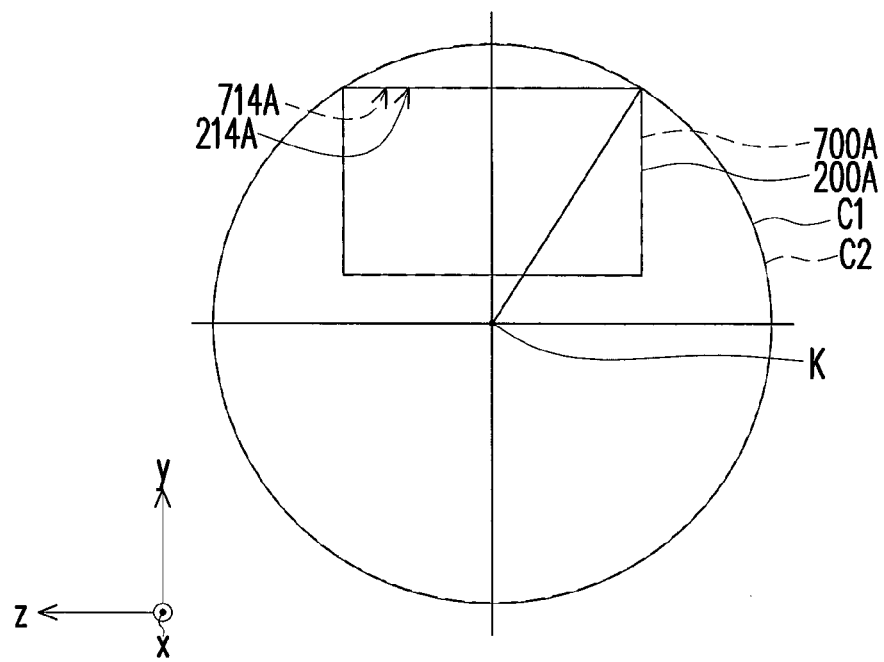
FIG. 5 illustrates a projection image of the light valve on the screen, an image circle of the projection image, a capture image of the image sensor on the screen and an image circle of the capture image according to another exemplary embodiment of the invention.

FIG. 5 illustrates a projection image of the light valve on the screen, an image circle of the projection image, a capture image of the image sensor on the screen and an image circle of the capture image according to another exemplary embodiment of the invention. Referring to FIG. 1 and FIG. 5, in the embodiment, $AR_{sensor}$ is equal to $AR_{DMD}$. The design of magnification ratio of the image capture lens 400 make the projection image 200A of the light valve 200 on the screen 600 (as paper surface in FIG. 5) be superimposed with the capture image 700A of the image sensor 700 on the screen 600. If $O_{sensor}$ and $O_{DMD}$ satisfy the equation 2: $O_{sensor}=O_{DMD}$, the image circle C1 of the projection image 200A is match with the image circle C2 of the capture image 700A. Thereby, the image circle C2 of the capture image 700A could be fully utilized, and the size of the image capture lens 400 may be minimum. In the same time, the image projection and capture apparatus of the embodiment has optimal size.

Figure 6:
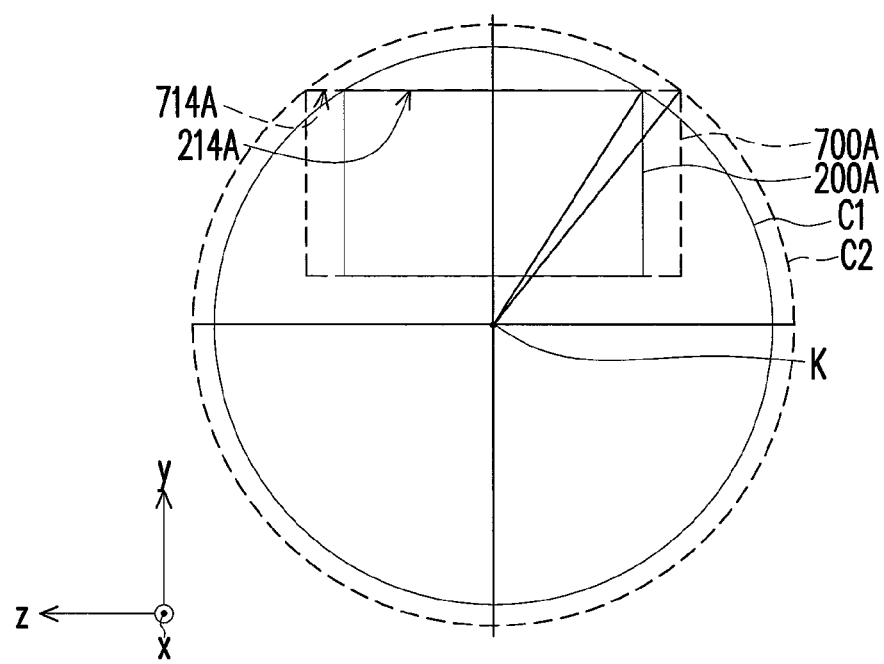
FIG. 6 illustrates a projection image of the light valve on the screen, an image circle of the projection image, a capture image of the image sensor on the screen and an image circle of the capture image according to another exemplary embodiment of the invention.

FIG. 6 illustrates a projection image of the light valve on the screen, an image circle of the projection image, a capture image of the image sensor on the screen and an image circle of the capture image according to another exemplary embodiment of the invention. Referring to FIG. 1 and FIG. 6, in the embodiment, $AR_{sensor}$ is greater than $AR_{DMD}$. Two long sides 214A of the projection image 200A of the light valve 200 on the screen 600 (as paper surface in FIG. 6) match with two long sides 714A of the capture image 700A of the image sensor 700 on the screen 600. If $O_{sensor}$ and $O_{DMD}$ satisfy the equation 3: $O_{sensor}=O_{DMD}$, the image circle C2 of the capture image 700A can fully cover the image circle C1 of the projection image 200A and the radius of the image circle C2 of the capture image 700A can be minimum. In the same time, the image projection and capture apparatus of the embodiment has optimal size.

The Second Embodiment

Figure 7:
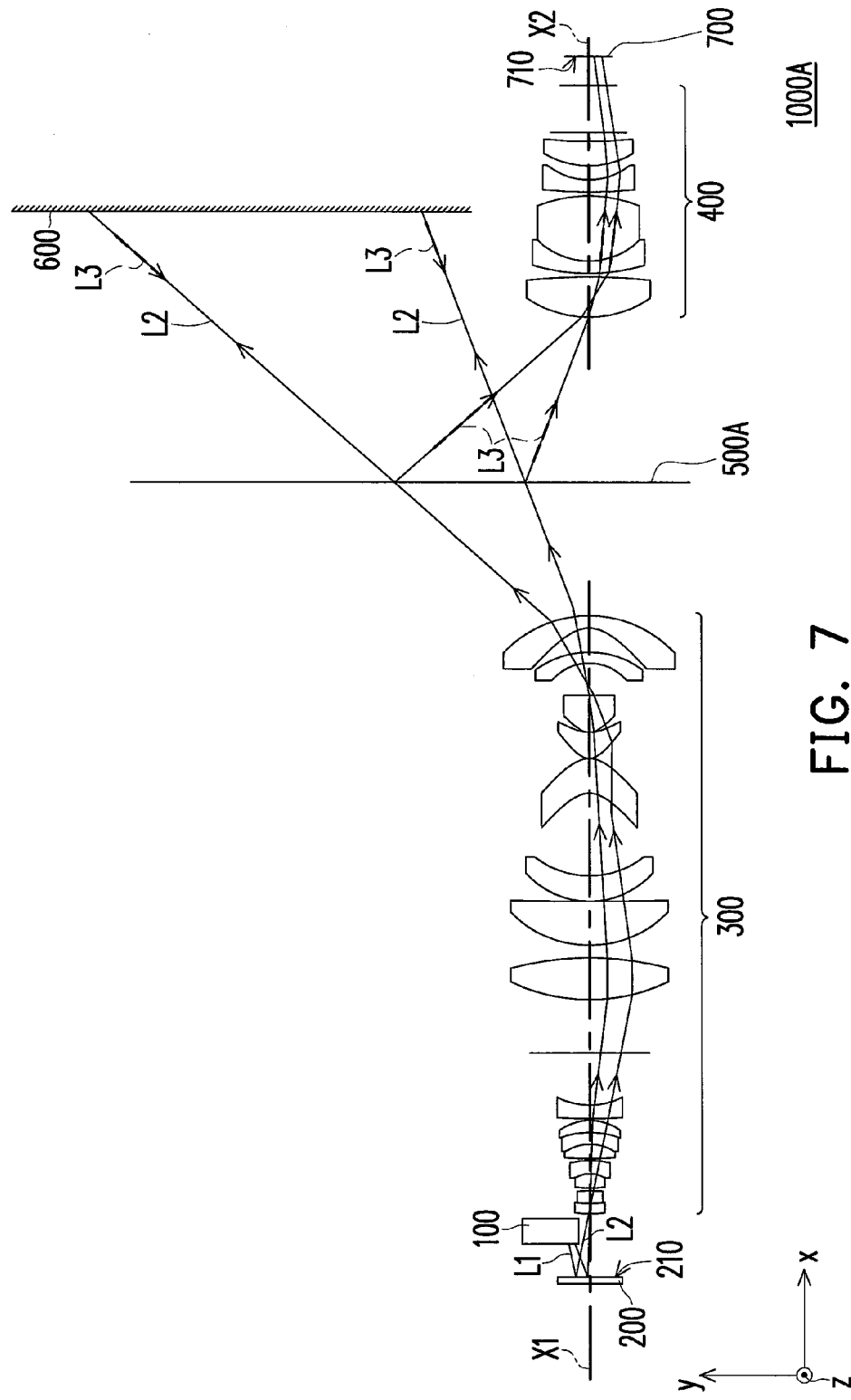
FIG. 7 is a diagram of the image projection and capture apparatus according to the second embodiment of the invention.

FIG. 7 is a diagram of the image projection and capture apparatus according to the second embodiment of the invention. Referring to FIG. 7, the image projection and capture apparatus 1000A described in the embodiment is similar to the image projection and capture apparatus 1000 in the first embodiment, and thus the same or similar reference numerals used in the embodiment and in the first embodiment represent the same or similar elements. The difference between the image projection and capture apparatus 1000 and the image projection and capture apparatus 1000A lies in that the dichroic unit 500A of the second embodiment is different from the dichroic unit 500 of the first embodiment. The difference will be demonstrated below, while the similarity will not be further described.

In the above-mentioned embodiment, the dichroic unit 500A is capable of reflecting the sensing beam L3 and be passed through by the image beam L2. The image beam L2 from the projection lens 300 passes through the dichroic unit 500A to the screen 600. The sensing beam L3 from the screen 600 is reflected to the image capture lens 400 by the dichroic unit 500A. In addition, the image projection and capture apparatus 1000A described in the embodiment has the effects and advantages similar to the image projection and capture apparatus 1000 described in the first embodiment, and thus no further descriptions are given hereinafter.

The Third Embodiment

Figure 8:
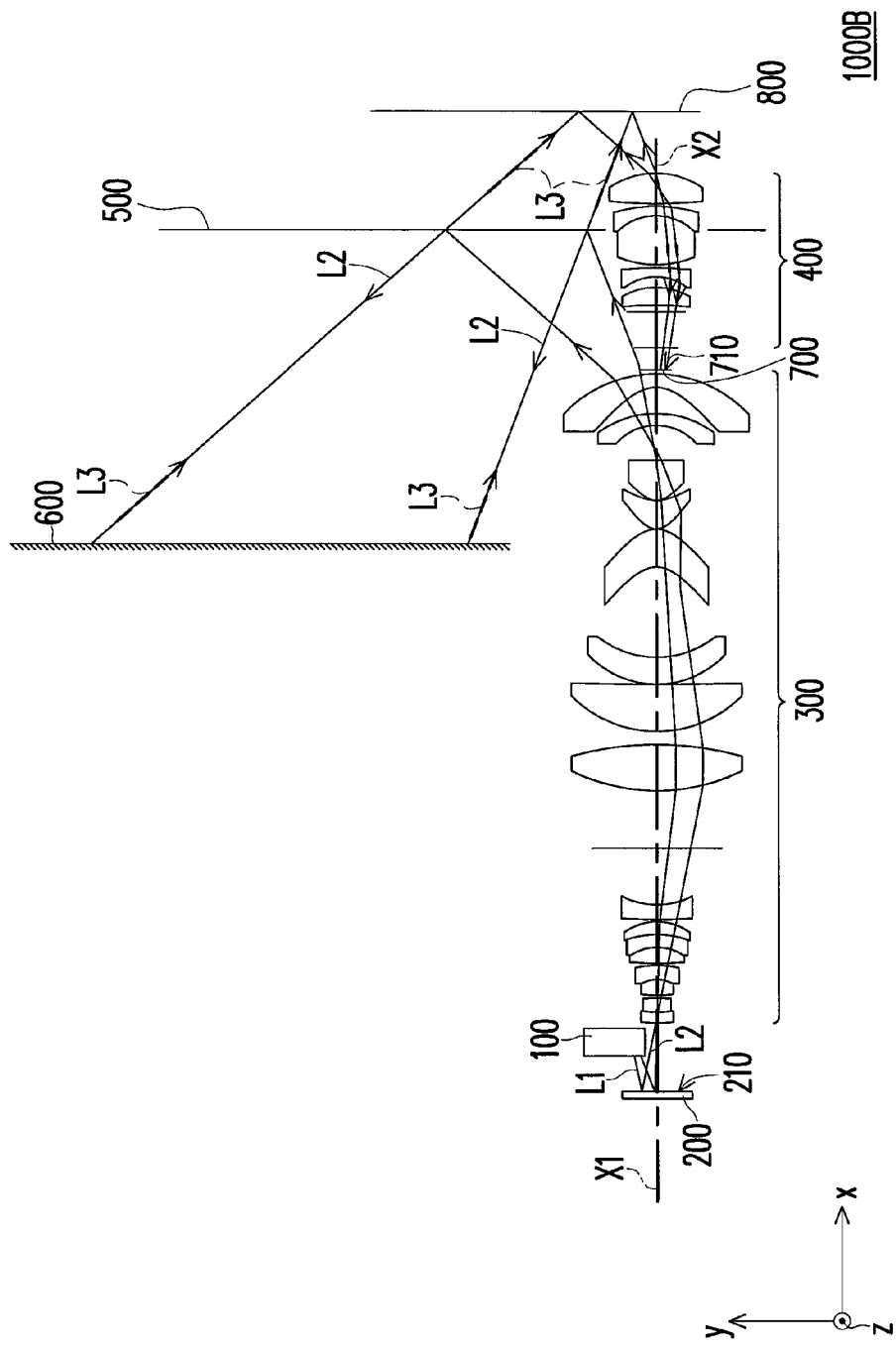
FIG. 8 is a diagram of the image projection and capture apparatus according to the third embodiment of the invention.

FIG. 8 is a diagram of the image projection and capture apparatus according to the third embodiment of the invention. Referring to FIG. 8, the image projection and capture apparatus 1000B described in the embodiment is similar to the image projection and capture apparatus 1000 in the first embodiment, and thus the same or similar reference numerals used in the embodiment and in the first embodiment represent the same or similar elements. The difference between the image projection and capture apparatus 1000 and the image projection and capture apparatus 1000B lies in that the image projection and capture apparatus 1000B further comprises a reflector 800. The difference will be demonstrated below, while the similarity will not be further described.

The image projection and capture apparatus 1000B of the embodiment further comprises the reflector 800. The dichroic unit 500 and the image capture lens 400 are disposed between the reflector 800 and the projection lens 300. In detail, the image capture lens 400 may penetrates the dichroic unit 500, and the image capture lens 400 may be disposed between the image sensor 700 and the reflector 800. In the present embodiment, the reflector 800 is capable of reflecting the sensing beam L3, and the sensing beam L3 of the present embodiment may be an invisible beam. The invisible beam may be an infrared ray. However, the invention is not limited thereto.

In the present embodiment, the image beam L2 from the projection lens 300 is reflected to the screen 600 by the dichroic unit 500. The sensing beam L3 from the screen 600 may pass through the dichroic unit 500 to the reflector 800. Then, the sensing beam L3 may be reflected to the image capture lens 400 by the reflector 800. Then the sensing beam L3 is received by the image sensor 700. The size of the image projection and capture apparatus 1000B may be further reduced by the reflector 800. In addition, the image projection and capture apparatus 1000B described in the present embodiment has the effects and advantages similar to the image projection and capture apparatus 1000 described in the first embodiment, and thus no further descriptions are given hereinafter.

The Fourth Embodiment

Figure 9:
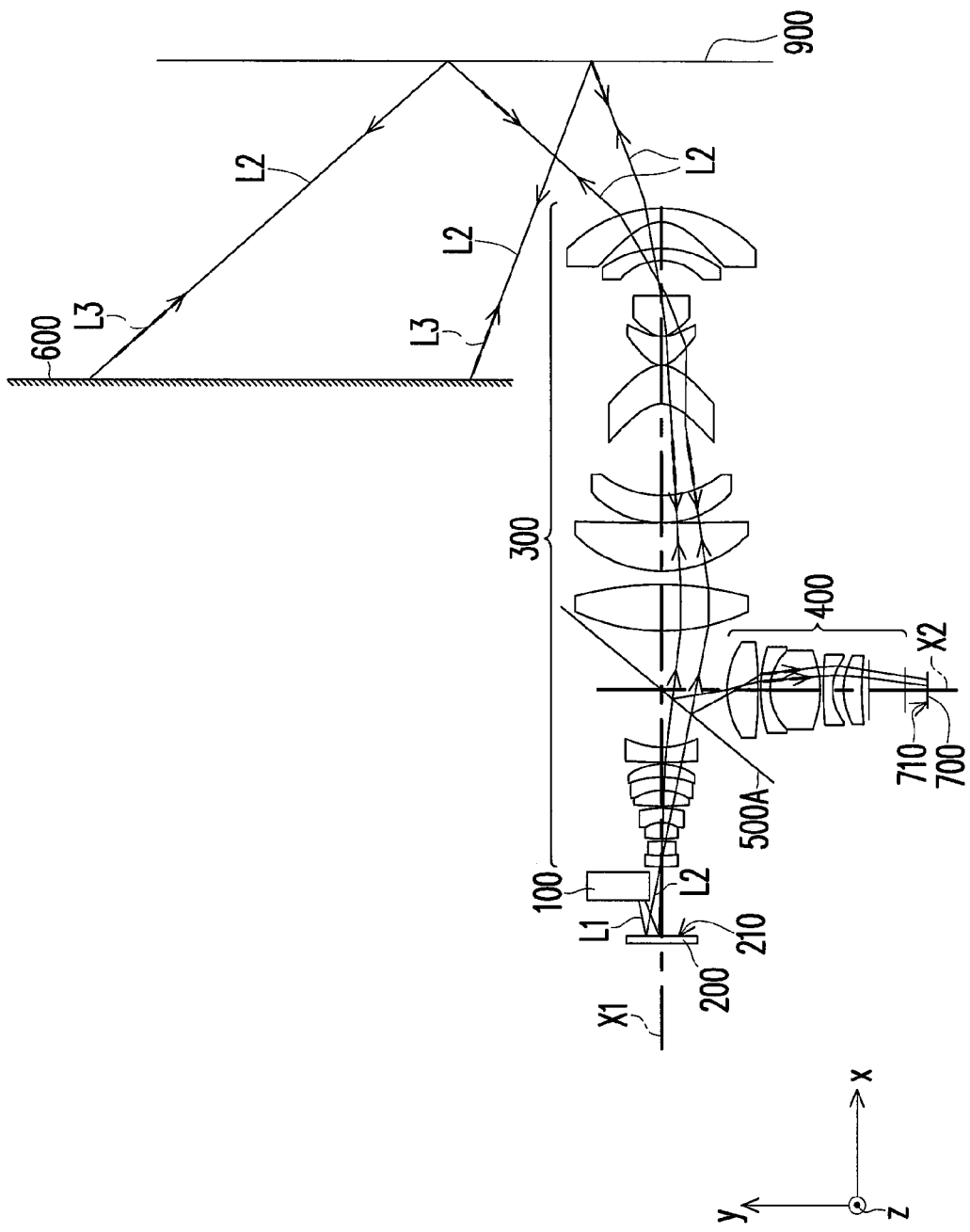
FIG. 9 is a diagram of the image projection and capture apparatus according to the fourth embodiment of the invention.

FIG. 9 is a diagram of the image projection and capture apparatus according to the fourth embodiment of the invention. Referring to FIG. 9, the image projection and capture apparatus 1000C described in the embodiment is similar to the image projection and capture apparatus 1000 in the first embodiment, and thus the same or similar reference numerals used in the present embodiment and in the first embodiment represent the same or similar elements. The differences between the image projection and capture apparatus 1000 and the image projection and capture apparatus 1000C will be demonstrated below, while the similarity will not be further described.

In the embodiment, the first optical axis X1 and the second optical axis X2 are interlaced. In detail, the first optical axis X1 may be substantially perpendicular to the second optical axis X2. The dichroic unit 500A of the embodiment may be disposed inside the projection lens 300. In detail, the first optical axis X1 may be interlaced with the second optical axis X2 at a location of the dichroic unit 500A. In the present embodiment, the dichroic unit 500A is capable of reflecting the sensing beam L3 and be passed through by the image beam L2.

The image projection and capture apparatus 1000C of the embodiment further comprises a reflecting unit 900. The image beam L2 from the light valve 200 may pass through the projection lens 300 and the dichroic unit 500A. Then, the image beam L2 may be reflected to the screen 600 by the reflecting unit 900. The sensing beam L3 from the screen 600 is reflected to the image capture lens 400 by the reflecting unit 900. In detail, the sensing beam L3 from the screen 600 reflected by the reflecting unit 900 passes through a part of the projection lens 300 to the dichroic unit 500A. Then, the sensing beam L3 is reflected to the image capture lens 400 by the dichroic unit 500A. In addition, the image projection and capture apparatus 1000C described in the embodiment has the effects and advantages similar to the image projection and capture apparatus 1000 described in the first embodiment, and thus no further descriptions are given hereinafter.

In summary, the image projection and capture apparatus of the invention may avoid distortion of the sensing image by the design that the first optical axis and the second optical axis are collinear. Also, since the first optical axis and the second optical axis are collinear, the image capture position may not be affected by the change of the projection distance. Thereby, the interaction sensitivity of the image projection and capture apparatus of the invention is good.

Moreover, in the image projection and capture apparatus of the invention, the image circle of the capture image could be fully utilized by designing the relationship between the aspect ratio of the light valve, the offset of the light valve, the aspect ratio of the image sensor, and the offset of the image sensor. Thereby, the size of the image capture lens may be minimum, and the image projection and capture apparatus has optimal size.

The foregoing description of the preferred embodiments of the invention has been presented for purposes of illustration and description. It will be apparent to those skilled in the art that the descriptions above are several preferred embodiments of the invention only, which does not limit the implementing range of the invention. Various modifications and variations may be made to the structure of the invention without departing from the scope or spirit of the invention. The claim scope of the invention is defined by the claims hereinafter. In addition, any one of the embodiments or claims of the invention is not necessarily to achieve all of the above-mentioned objectives, advantages or features. The abstract and the title herein are used to assist searching the documentations of the relevant patents, not to limit the claim scope of the invention; the ordinal numbers prior to some elements, such as first, second and the like, are used to represent the names of the elements only, not to restricts the upper limit or lower limit of the quantity of the elements.

What is claimed is:

1. An image projection and capture apparatus for projecting an image beam to display an image on a screen and sensing a sensing beam from the image on the screen, comprising:

a light source, capable of providing an illumination beam;

a light valve, disposed on a light path of the illumination beam and capable of converting the illumination beam to the image beam;

a projection lens and an image capture lens, wherein the projection lens is disposed on a light path of the image beam and has a first optical axis and the image capture lens has a second optical axis;

a dichroic unit, disposed on the light path of the image beam; and an image sensor, disposed on a light path of the sensing beam, wherein the light valve has a first active surface perpendicular to the first optical axis, the first active surface is rectangular, the first active surface has two first long edges and two first short edges, one of the two first short edges has a first width D along a first direction perpendicular to the first optical axis, one of the two long edges has a first length E along a second direction perpendicular to the first direction and the first optical axis, a distance F exists between the first optical axis and one of the two first long edges closer to the first optical axis, the light valve has a first aspect ratio $AR_{DMD}=[E/D]$, and a first offset $O_{DMD}=[(D+F)/D]*100\%$, wherein the image sensor has a second active surface perpendicular to the second optical axis, the second active surface is rectangular and has two second long edges and two second short edges, one of the two second short edges has a second width A along a third direction perpendicular to the second optical axis, one of the second long edges has a second length B along a fourth direction perpendicular to the third direction and the second optical axis, a distance C exists between the second optical axis and one of the two second long edges closer to the second optical axis, the image sensor has a second aspect ratio $AR_{sensor}=[B/A]$, and a second offset $O_{sensor}=[(A+C)/A]*100\%$, wherein when $AR_{sensor}$ is smaller than $AR_{DMD}$, $O_{sensor}$ and $O_{DMD}$ satisfy: $O_{sensor}=O_{DMD}*(AR_{sensor}/AR_{DMD})$, and when $AR_{sensor}$ is greater than $AR_{DMD}$ or equal to $AR_{DMD}$, $O_{sensor}$ and $O_{DMD}$ satisfy: $O_{sensor}=O_{DMD}$.

2. The image projection and capture apparatus as claimed in claim 1, wherein the sensing beam is an invisible beam.

3. The image projection and capture apparatus as claimed in claim 2, wherein the invisible beam is an infrared ray.

4. The image projection and capture apparatus as claimed in claim 1, wherein the first optical axis and the second optical axis are parallel and overlapped, and the dichroic unit is disposed between the projection lens and the image capture lens.

5. The image projection and capture apparatus as claimed in claim 1, wherein the sensing beam passes through the dichroic unit to the image capture lens, the image beam from the projection lens is reflected to the screen by the dichroic unit.

6. The image projection and capture apparatus as claimed in claim 1, wherein the sensing beam from the screen is reflected to the image capture lens by the dichroic unit, the image beam from the projection lens passes through the dichroic unit to the screen.

7. The image projection and capture apparatus as claimed in claim 1, further comprising: a reflector, wherein the dichroic unit and the image capture lens are disposed between the reflector and the projection lens, the sensing beam from the screen passes through the dichroic unit to the reflector, the sensing beam is reflected to the image capture lens by the reflector, and the image beam from the projection lens is reflected to the screen by the dichroic unit.

8. The image projection and capture apparatus as claimed in claim 7, wherein the image capture lens penetrates the dichroic unit.

9. The image projection and capture apparatus as claimed in claim 7, wherein the reflector is capable of reflecting an invisible beam.

10. The image projection and capture apparatus as claimed in claim 1, wherein the dichroic unit is a dichroic mirror.

11. An image projection and capture apparatus for projecting an image beam to display an image on a screen and sensing a sensing beam from the image on the screen, comprising:

a light source, capable of providing an illumination beam;

a light valve, disposed on a light path of the illumination beam and capable of converting the illumination beam to the image beam;

a projection lens, disposed on a light path of the image beam and has a first optical axis;

a dichroic unit, disposed on the light path of the image beam;

an image capture lens has a second optical axis, where the first optical axis and the second optical axis are interlaced; and an image sensor, disposed on a light path of the sensing beam; wherein the light valve has a first active surface perpendicular to the first optical axis, the first active surface is rectangular and has two first long edges and two first short edges, one of the two first short edges has a first width D along a first direction perpendicular to the first optical axis, one of the two long edges has a first length E along a second direction perpendicular to the first direction and the first optical axis, a distance F exists between the first optical axis and one of the two first long edges closer to the first optical axis, the light valve has a first aspect ratio $AR_{DMD}=[E/D]$ and a first offset $O_{DMD}=[(D+F)/D]*100\%$, wherein the image sensor has a second active surface perpendicular to the second optical axis, the second active surface is rectangular and has two second long edges and two second short edges, one of the two second short edges has a second width A along a third direction perpendicular to the second optical axis, one of the second long edges has a second length B along a fourth direction perpendicular to the third direction and the second optical axis, a distance C exists between the second optical axis and one of the two second long edges closer to the second optical axis, the image sensor has a second aspect ratio $AR_{sensor}=[B/A]$ and a second offset $O_{sensor}=[(A+C)/A*]100\%$ wherein when $AR_{sensor}$ is smaller than $AR_{DMD}$, $O_{sensor}$ and $O_{DMD}$ satisfy: $O_{sensor}=O_{DMD}*(AR_{sensor}/AR_{DMD})$, and when $AR_{sensor}$ is greater than $AR_{DMD}$ or equal to $AR_{DMD}$, $O_{sensor}$ and $O_{DMD}$ satisfy: $O_{sensor}=O_{DMD}$.

12. The image projection and capture apparatus as claimed in claim 11, wherein the dichroic unit is disposed inside the projection lens, and the first optical axis is interlaced with the second optical axis at a location of the dichroic unit.

13. The image projection and capture apparatus as claimed in claim 11, wherein the sensing beam is an invisible beam.

14. The image projection and capture apparatus as claimed in claim 11, further comprising: a reflecting unit, the image beam from the projection lens is reflected to the screen by the reflecting unit, and the sensing beam from the screen is reflected to the image capture lens by the reflecting unit.

15. The image projection and capture apparatus as claimed in claim 11, wherein the image beam passes through the dichroic unit to the screen, and the sensing beam is reflected to the image capture lens by the dichroic unit.

16. The image projection and capture apparatus as claimed in claim 11, wherein the first optical axis is substantially perpendicular to the second optical axis.

* * * * *